United States Patent Office 3,393,207
Patented July 16, 1968

3,393,207
METHOD OF PRODUCING PHTHALIC
ANHYDRIDE
Tetsuji Ono, Amagasaki-shi, Yukio Okuda, Toyonaka-shi, Kenzo Oda, Osaka-shi, and Shigeru Sakuyama, Nishinomiya-shi, Japan, assignors to Nippon Shokubai Kagaku Kogyo Co., Ltd., Osaka, Japan, a corporation of Japan
No Drawing. Filed Sept. 17, 1965, Ser. No. 488,285
Claims priority, application Japan, Sept. 22, 1964, 39/53,898
19 Claims. (Cl. 260—346.4)

ABSTRACT OF THE DISCLOSURE

A method of producing phthalic anhydride by the catalytic oxidation of orthoxylene in the vapor phase with molecular oxygen wherein such vapor phase catalytic oxidation is conducted in the presence of a catalyst comprising 5–100 mols of $WO_3$, 1–10 mols of $P_2O_5$ and 1–30 mols of $Na_2O$ per 100 mols of $V_2O_5$. The catalyst system may also contain per 100 mols of $V_2O_5$, 1–10 mols of $Na_2SO_4$, 1–10 mols of $K_2SO_4$, 1–15 mols of MgO, 1–15 mols of $TiO_2$, 1–15 mols of $ZrO_2$, 1–5 mols of $SnO_2$, 1–15 mols of MnO and mixtures thereof.

---

This invention relates to a method of producing phathalic anhydride. More particularly, the invention relates to a method of producing phthalic anhydride by the catalytic oxidation in the vapor phase of orthoxylene with molecular oxygen in the presence of a catalyst predominantly of $V_2O_5$, $WO_3$, $P_2O_5$ and $Na_2O$.

The catalyst for high space velocity use (the American type) and the catalyst for low space velocity use (the German type) have been used in the past as catalyst in producing phthalic anhydride by oxidation of orthoxylene. As the catalyst for high space velocity use, that in which $V_2O_5$ has been supported on or fused to an inert carrier or that in which a composition consisting predominantly of $V_2O_5$ and $MoO_3$ with other metal oxides as auxiliary constituents is supported on an inert carrier is known. However, in the case of these catalysts, depending upon the class, the yield of phthalic anhydride is very low as compared with the theoretical yield.

A primary object of the present invention is to provide a catalyst for high space velocity use whereby phthalic anhydride can be produced from orthoxylene in good yield.

Another object of the invention is to provide a method of producing phthalic anhydride in good yield from orthoxylene by using a catalyst for high space velocity use.

Other objects of this invention will be apparent from the following description.

We found that the aforementioned objects could be attained by the catalytic oxidation in the vapor phase of orthoxylene with molecular oxygen under the reaction conditions of a gas concentration of 4–8 liters of oxygen (20–40 liters of air) per gram of orthoxylene, a space velocity of 4,000–10,000 hr.$^{-1}$ and a temperature of 400–500° C., in the presence of a catalyst consisting of (1) a substance having the analytical composition of 100 mols of $V_2O_5$, 5–100 mols, and preferably 10–50 mols, of $WO_3$, 1–10 mols, and preferably 1–5 mols, of $P_2O_5$, and 1–30 mols, and preferably 3–15 mols, of $Na_2O$, and either (2) a substance containing besides the several constituents mentioned in (1), above, 1–10 mols, and preferably 2–6 mols, of $Na_2SO_4$ or $K_2SO_4$ as an additional constituent, or (3) a substance containing, besides the several constituents mentioned in (2), above, 1–15 mols, and preferably 3–10 mols, of at least one of either MgO, $TiO_2$, $ZrO_2$, $SnO_2$ or MnO as an additional constituent, said substances being supported on a crystalline or non-crystalline carrier. When orthoxylene is oxidized in accordance with the present invention under the conditions as hereinabove noted while using a catalyst such as described above, a yield of phthalic anhydride of above 95% by weight, based on the orthoxylene, can be obtained regularly and under optimum conditions may reach as high as 104.5% by weight.

The raw material used for preparing the catalyst include the compounds which can form $V_2O_5$, $WO_3$, $P_2O_5$, $Na_2O$, MgO, $TiO_2$ $ZrO_2$, $SnO_2$ and MnO by calcining, e.g., the compounds such as the ammonium salts, nitrates and chlorides of the metal consituents of the first-named compounds and, on occasion, also sodium or potassium sulfate or the compounds which can form sulfates by heating or double decomposition, e.g., such compounds as the acid sulfates and pyrosulfates of sodium or potassium. These compounds are blended in amounts calculated in advance so as to obtain, after calcining, a catalyst having an analytical composition coming within the hereinbefore specified range. Although for convenience sake the composition of the invention catalyst has been shown as oxides and sulfates by means of an analytical expression as hereinbefore shown, it is to be understood that its essence, though not clear, is not just merely a mixture of the oxides and sulfates as may appear from the foregoing description.

In preparing the catalyst, first the foregoing blend is applied to the carrier in the form of a solution. The method adopted for applying the blend may be one wherein the solution is sprayed on to the preheated carriers or one wherein the inert carriers are mixed in the solution and thereafter dried hard by evaporation. If necessary, the solution is applied after rendering it completely homogeneous by adding oxalic or hydrochloric acid. While it is possible to use as the carrier any of the commonly used inert carriers such as fused alumina, silicon carbide, silica and pumice, particularly to be preferred according to the present invention are fused alumina and silicon carbide. The carrier may be crystalline or noncrystalline and its average diameter is suitably 3–10 mm.

The catalytic material which has been adhered to the carrier, as described above, is then calcined under circulation of air. The calcining temperature is preferably one which is higher than the temperature of the oxidation reaction, but it must be one which is lower than the melting point of the catalyst substances. This temperature usually ranges between 450° and 650° C., but a range between 500° and 600° C. is preferred. An abrupt rise or fall in the temperature during calcining should be avoided, since this will become the cause of a decline in the physical strength of the catalyst.

In using this catalyst to effect the catalytic oxidation in the vapor phase of orthoxylene with molecular oxygen, the reaction temperature (the temperature of the molten salt bath of the reactor) is suitably in the range between 400° and 500° C., and preferably a range between 420° and 470° C. On the other hand, the gas concentration should be up to 8 liters of oxygen (40 liters of air) per gram of orthoxylene, i.e., the lower limit of the range of explosion being the limit, particularly preferred being 6 liters of oxygen (30 liters of air) per gram of orthoxylene. For the space velocity a value ranging between 4,000 and 10,000 hr.$^{-1}$, and preferably between 5,000 and 7,000 hr.$^{-1}$, is chosen.

The several constituents of the invention catalyst and the several reaction conditions of the invention are interrelated and can be varied relatively of the other constituents and conditions within the foregoing range. Thus, according to this invention, phthalic anhydride can be obtained in good yield from orthoxylene, with the consequence that great benefits are manifested commercially.

$P_2O_5$ and $Na_2O$ in varied mole ratios were used. The results are presented in Table II.

TABLE II

| Ex. No. | Molar composition of Catalyst | | | | Reaction Temperature (°C.) | Yield of Phthalic Anhydride (Wt. percent) | Yield of Maleic Anhydride (Wt. percent) |
|---|---|---|---|---|---|---|---|
| | $V_2O_5$ | $WO_3$ | $P_2O_5$ | $Na_2O$ | | | |
| 5 | 100 | 0 | 4 | 12 | 460 | 87.1 | 9.1 |
| 6 | 100 | 5 | 1 | 3 | 460 | 96.3 | 8.9 |
| 7 | 100 | 30 | 15 | 45 | 460 | 30.0 | 12.1 |
| 8 | 100 | 100 | 5 | 15 | 450 | 97.2 | 9.2 |
| 9 | 100 | 40 | 0 | 0 | 460 | 82.5 | 11.7 |

The present invention is further illustrated by the following non-limitative examples.

Examples 1–4

250 cc. of an aqueous solution containing 20 grams of ammonium metavanadate, 6.75 grams of ammonium tungstate and 1.3 grams of sodium phosphate were applied to 150 cc. of fused alumina carriers having an average diameter of 3–9 mm., after which the carriers were calcined for 6 hours at 550° C. under circulation of air. The mole ratio composition of the resulting catalyst is $$V_2O_5:WO_3:P_2O_5:Na_2O = 100:30:2:6$$

Forty cc. of this catalyst were packed in a stainless steel reaction tube having an inside diameter of 25 mm., which was immersed in a molten salt bath. The reactions were carried out at varied temperatures of the molten salt bath ranging between 440° and 470° C., under the conditions of a gas concentration of 30 liters of air per gram of orthoxylene and a space velocity of 7000 hr.$^{-1}$. The results are presented in Table I. The purity of the orthoxylene used as the starting material was 99.0%.

TABLE I

| Example No. | Reaction Temperature (°C.) | Yield of Phthalic Anhydride (Wt. percent) | Yield of Maleic Anhydride (Wt. percent) |
|---|---|---|---|
| 1 | 440 | 95.7 | 7.0 |
| 2 | 450 | 96.7 | 7.3 |
| 3 | 460 | 98.4 | 7.2 |
| 4 | 470 | 99.2 | 7.5 |

Examples 5–9

The reactions were carried out as in Examples 1–4, except that five types of catalysts containing $V_2O_5$, $WO_3$, Examples 10–46

The examples illustrated the use of the invention catalysts which contain as the catalyst constituents $V_2O_5$, $WO_3$, $P_2O_5$ and $Na_2O$ as well as $Na_2SO_4$ or $K_2SO_4$ and at least one of MgO, $TiO_2$, $ZrO_2$, $SnO_2$ or MnO. These catalysts were prepared as in Examples 1–4, using as the starting materials ammonium metavanadate, ammonium tungstate, sodium phosphate, potassium sulfate, magnesium nitrate, titanium nitrate, zirconium nitrate, stannic chloride and/or manganese sulfate.

In Table III are shown the composition of these catalysts and the results obtained by their use.

TABLE III

| Ex. No. | Molar Composition of Catalyst | | | | | | | | | | Carrier | Reaction Temperature (°C.) | Yield of Phthalic Anhydride (Wt. percent) | Yield of Maleic Anhydride (Wt. percent) |
|---|---|---|---|---|---|---|---|---|---|---|---|---|---|---|
| | $V_2O_5$ | $WO_3$ | $P_2O_5$ | $Na_2O$ | $K_2SO_4$ | MgO | $TiO_2$ | $ZrO_2$ | $SnO_2$ | MnO | | | | |
| 10 | 100 | 40 | 4 | 12 | 3 | 0 | 0 | 0 | 0 | 0 | Silicon carbide | 460 | 97.5 | 7.2 |
| 11 | 100 | 40 | 4 | 12 | 3 | 0 | 0 | 0 | 3 | 0 | do | 430 | 98.7 | 6.3 |
| 12 | 100 | 40 | 4 | 12 | 3 | 0 | 0 | 0 | 3 | 0 | do | 450 | 102.7 | 7.0 |
| 13 | 100 | 40 | 4 | 12 | 3 | 0 | 0 | 0 | 3 | 0 | do | 460 | 101.8 | 7.4 |
| 14 | 100 | 40 | 4 | 12 | 3 | 0 | 0 | 3 | 0 | 0 | Pumice | 440 | 100.3 | 6.9 |
| 15 | 100 | 40 | 4 | 12 | 3 | 0 | 0 | 3 | 0 | 0 | do | 450 | 102.1 | 7.3 |
| 16 | 100 | 40 | 4 | 12 | 3 | 0 | 0 | 3 | 0 | 0 | do | 460 | 100.2 | 7.8 |
| 17 | 100 | 40 | 4 | 12 | 3 | 0 | 6 | 0 | 0 | 0 | do | 440 | 101.9 | 6.2 |
| 18 | 100 | 40 | 4 | 12 | 3 | 0 | 6 | 0 | 0 | 0 | do | 450 | 103.4 | 6.4 |
| 19 | 100 | 40 | 4 | 12 | 3 | 0 | 6 | 0 | 0 | 0 | do | 460 | 102.1 | 7.1 |
| 20 | 100 | 40 | 4 | 12 | 3 | 0 | 0 | 0 | 0 | 5 | Fused alumina | 440 | 103.7 | 6.3 |
| 21 | 100 | 40 | 4 | 12 | 3 | 0 | 0 | 0 | 0 | 5 | do | 450 | 104.5 | 6.6 |
| 22 | 100 | 40 | 4 | 12 | 3 | 0 | 0 | 0 | 0 | 5 | do | 460 | 103.5 | 7.1 |
| 23 | 100 | 40 | 4 | 12 | 3 | 3 | 0 | 0 | 0 | 0 | do | 440 | 98.8 | 6.0 |
| 24 | 100 | 40 | 4 | 12 | 3 | 3 | 0 | 0 | 0 | 0 | do | 450 | 100.5 | 6.2 |
| 25 | 100 | 40 | 4 | 12 | 3 | 3 | 0 | 0 | 0 | 0 | do | 460 | 101.0 | 6.5 |
| 26 | 100 | 40 | 4 | 12 | 3 | 0 | 0 | 2 | 0 | 3 | Silicon carbide | 430 | 98.1 | 6.3 |
| 27 | 100 | 40 | 4 | 12 | 3 | 0 | 0 | 2 | 0 | 3 | do | 440 | 99.5 | 6.9 |
| 28 | 100 | 40 | 4 | 12 | 3 | 0 | 0 | 2 | 0 | 3 | do | 450 | 101.5 | 7.0 |
| 29 | 100 | 40 | 4 | 12 | 3 | 0 | 0 | 2 | 0 | 3 | do | 460 | 101.7 | 7.2 |
| 30 | 100 | 30 | 4 | 12 | 3 | 0 | 10 | 0 | 0 | 0 | Fused alumina | 430 | 103.1 | 6.1 |
| 31 | 100 | 10 | 1 | 3 | 5 | 0 | 0 | 0 | 12 | 0 | do | 440 | 99.3 | 6.9 |
| 32 | 100 | 40 | 4 | 12 | 7 | 0 | 0 | 0 | 3 | 10 | do | 430 | 99.5 | 7.2 |
| 33 | 100 | 40 | 4 | 12 | 7 | 0 | 0 | 0 | 3 | 10 | do | 440 | 100.7 | 8.1 |
| 34 | 100 | 70 | 4 | 12 | 3 | 3 | 7 | 0 | 0 | 0 | do | 440 | 98.9 | 7.9 |
| 35 | 100 | 70 | 4 | 12 | 3 | 3 | 7 | 0 | 0 | 0 | do | 450 | 99.8 | 8.0 |
| 36 | 100 | 50 | 4 | 12 | 3 | 0 | 0 | 0 | 0 | 5 | do | 440 | 102.3 | 6.4 |
| 37 | 100 | 50 | 4 | 12 | 3 | 0 | 0 | 0 | 0 | 5 | do | 450 | 102.1 | 6.5 |
| 38 | 100 | 50 | 4 | 12 | 3 | 0 | 0 | 0 | 0 | 5 | do | 460 | 101.4 | 6.9 |
| 39 | 100 | 40 | 4 | 12 | 3 | 0 | 0 | 0 | 0 | 10 | do | 430 | 96.7 | 9.3 |
| 40 | 100 | 40 | 4 | 12 | 3 | 0 | 0 | 0 | 0 | 10 | do | 440 | 98.5 | 9.8 |
| 41 | 100 | 40 | 6 | 18 | 2 | 0 | 0 | 0 | 0 | 5 | do | 470 | 95.2 | 6.0 |
| 42 | 100 | 30 | 2 | 6 | 3 | 0 | 0 | 0 | 0 | 5 | do | 440 | 102.0 | 7.0 |
| 43 | 100 | 30 | 2 | 6 | 3 | 0 | 0 | 0 | 0 | 5 | do | 450 | 102.9 | 7.2 |
| 44 | 100 | 30 | 2 | 6 | 3 | 0 | 0 | 0 | 0 | 5 | do | 460 | 101.9 | 7.6 |
| 45 | 100 | 10 | 1 | 3 | 3 | 0 | 0 | 0 | 0 | 5 | do | 450 | 95.7 | 9.1 |
| 46 | 100 | 10 | 1 | 3 | 3 | 0 | 0 | 0 | 0 | 5 | do | 460 | 97.3 | 8.9 |

Examples 47 and 48

250 cc. of an aqueous solution containing 20 grams of ammonium metavanadate, 9 grams of ammonium tungstate, 2.6 grams of sodium phosphate, 0.67 gram of sodium pyrosulfate and 1.86 grams of titanium tetrachloride were applied to 150 cc. of pumice having an average diameter of 7–9 mm., after which the pumice was calcined for 6 hours at 550° C. The mole ratio composition of the so obtained catalyst is $$V_2O_5:WO_3:P_2O_5:Na_2O:Na_2SO_4:TiO_2 = 100:40:4:12:3:6$$

Seventy cc. of this catalyst were packed in a reaction tube as in Examples 1–4, and then the reactions were carried out at 440° C. and 450° C. and space velocities of 5000 hr.$^{-1}$ and 7000 hr.$^{-1}$, respectively, under the conditions of a gas concentration of 30 liters of air per gram of orthoxylene. The results are presented in Table IV. The purity of the orthoxylene used was 99.0%.

TABLE IV

| Example No. | Reaction Temperature (° C.) | Space Velocity (hr.$^{-1}$) | Yield of Phthalic Anhydride (Wt. percent) | Yield of Maleic Anhydride (Wt. percent) |
| --- | --- | --- | --- | --- |
| 47 | 440 | 5,000 | 99.8 | 9.1 |
| 48 | 450 | 7,000 | 101.5 | 9.1 |

We claim:

1. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$ and 1 to 30 mols of $Na_2O$ per 100 mols of $V_2O_5$.

2. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1–30 mols of $Na_2O$ and 1 to 10 mols of $Na_2SO_4$ per 100 mols of $V_2O_5$.

3. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$ and 1 to 10 mols of $K_2SO_4$ per 100 mols of $V_2O_5$.

4. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1–10 mols of $Na_2SO_4$ and 1 to 15 mols of MgO per 100 mols of $V_2O_5$.

5. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and 1 to 15 mols of MgO per 100 mols of $V_2O_5$.

6. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and 1 to 15 mols of $TiO_2$ per 100 mols of $V_2O_5$.

7. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and 1 to 15 mols of $TiO_2$ per 100 mols of $V_2O_5$.

8. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and 1 to 15 mols of $ZrO_2$ per 100 mols of $V_2O_5$.

9. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and 1 to 15 mols of $ZrO_2$ per 100 mols of $V_2O_5$.

10. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and 1 to 15 mols of $SnO_2$ per 100 mols of $V_2O_5$.

11. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and 1 to 15 mols of $SnO_2$ per 100 mols of $V_2O_5$.

12. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and 1 to 15 mols of MnO per 100 mols of $V_2O_5$.

13. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and 1 to 15 mols of MnO per 100 mols of $V_2O_5$.

14. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and a total of 1 to 15 mols of $TiO_2$ and MgO per 100 mols of $V_2O_5$.

15. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and a total of 1 to 15 mols of $TiO_2$ and MgO per 100 mols of $V_2O_5$.

16. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and a total of 1 to 15 mols of $ZrO_2$ and MnO per 100 mols of $V_2O_5$.

17. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and a total of 1 to 15 mols of $ZrO_2$ and MnO per 100 mols of $V_2O_5$.

18. A method of producing phthalic anhydride which comprises effecting the catalytic oxidation in the vapor phase of orthoxylene with molecular oxygen under the conditions of a gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $Na_2SO_4$ and a total of 1 to 15 mols of $SnO_2$ and MnO per 100 mols of $V_2O_5$.

19. A method of producing phthalic anhydride which comprises effecting the catalytic oxidation in the vapor phase of orthoxylene with molecular oxygen under the conditions of gas concentration of 4 to 8 liters of oxygen per gram of orthoxylene, a space velocity of 4,000 to 10,000 hr.$^{-1}$ and a temperature of 400° to 500° C., in the presence of a catalyst comprising a carrier-supported substance having the analytical composition of 5 to 100 mols of $WO_3$, 1 to 10 mols of $P_2O_5$, 1 to 30 mols of $Na_2O$, 1 to 10 mols of $K_2SO_4$ and a total of 1 to 15 mols of $SnO_2$ and MnO per 100 mols of $V_2O_5$.

References Cited

UNITED STATES PATENTS

| | | | |
|---|---|---|---|
| 1,489,741 | 4/1924 | Craver | 260—346.4 |
| 1,809,752 | 6/1931 | Jaeger | 260—346.4 |
| 1,909,354 | 7/1933 | Jaeger | 260—346.4 |
| 2,698,306 | 12/1954 | Matejczyk | 260—346.4 |
| 3,232,955 | 2/1966 | Nonnenmacher et al. | 260—346.4 |

OTHER REFERENCES

Marisic, Milton M.: J. Am. Chem. Soc., vol. 62, 1940, pp. 2312–17.

Sherwood, Peter W.: Industrial Chemist, vol. 35, 1959, pp. 447–50 and pp. 492–94.

Sherwood, Peter W.: Industrial Chemist, vol. 36, 1960, pp. 21–24.

NICHOLAS S. RIZZO, *Primary Examiner.*

ALTON D. ROLLINS, *Examiner.*

B. I. DENTZ, *Assistant Examiner.*